United States Patent
Fritz

[15] 3,664,291
[45] May 23, 1972

[54] RIBBON-TYPE GARAGE PARKING DEVICE

[72] Inventor: Paul C. Fritz, 1441 Colleen Lane, McLean, Va. 22101

[22] Filed: Feb. 5, 1971

[21] Appl. No.: 112,886

[52] U.S. Cl. ..........................116/28, 40/138, 49/9, 256/23
[51] Int. Cl. ..........................................................B60q
[58] Field of Search ............116/28, 114, 63; 40/128, 138; 256/23, 13.1; 49/9, 34; 340/61

[56] References Cited

UNITED STATES PATENTS

| | | |
|---|---|---|
| 993,729 | 5/1911 | Steininger..........................49/34 X |
| 1,981,188 | 11/1934 | Pavitt...................................116/28 |
| 2,122,253 | 6/1938 | Humphreys........................116/28 |
| 2,454,896 | 11/1948 | Traub..................................340/61 |
| 2,488,509 | 11/1949 | Lewin..............................116/22 A |
| 2,854,942 | 10/1958 | Ross....................................116/28 |
| 3,132,624 | 5/1964 | Shoemaker, Jr....................116/63 |
| 3,471,130 | 10/1969 | Severns..............................49/9 X |

Primary Examiner—Louis J. Capozi

[57] ABSTRACT

This invention relates to an improved target and signaling device used for precise positioning of an automobile in a garage, and which is comprised of a high-visibility, draped, flexible ribbon suspended from the garage ceiling, weighted at the lower end to hold it taut, and located at the front of the desired parked position of the automobile.

1 Claim, 4 Drawing Figures

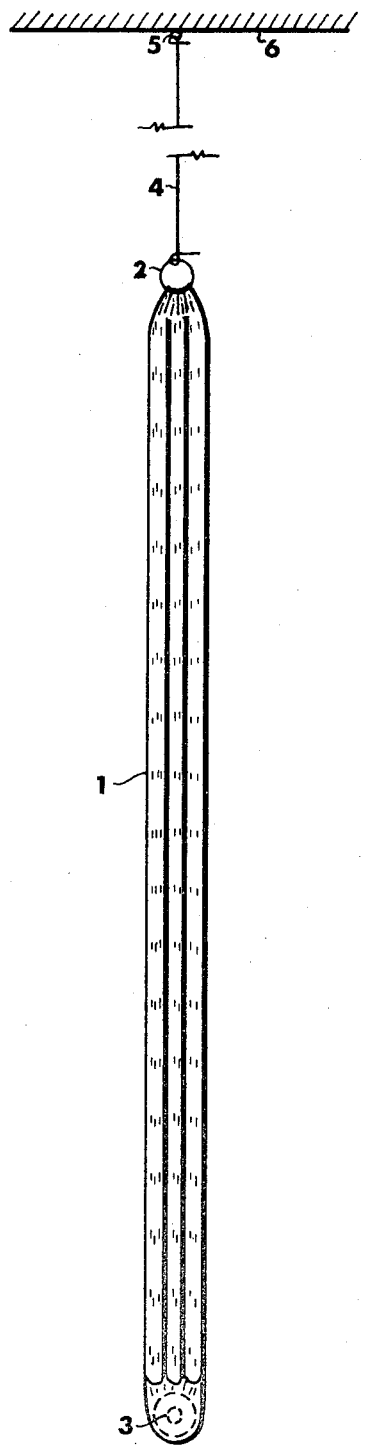
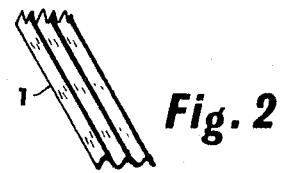
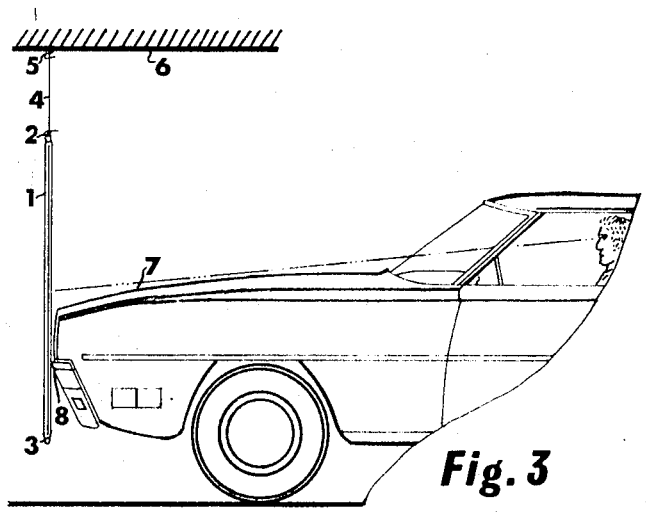
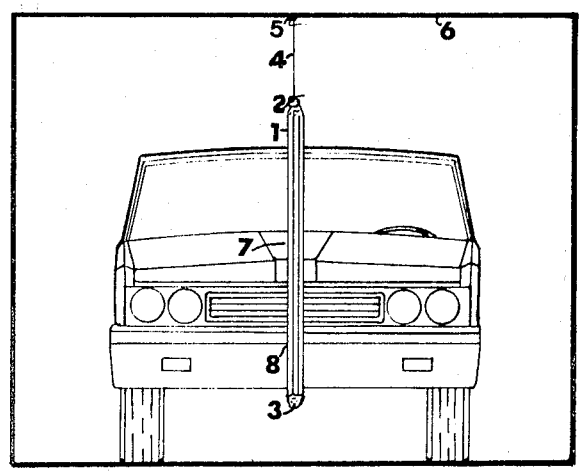
Fig. 1
Fig. 2
Fig. 3
Fig. 4

# 3,664,291

RIBBON-TYPE GARAGE PARKING DEVICE

BACKGROUND OF THE INVENTION

This invention pertains to the field of automobile parking devices for use within home garages, whereby the operator is provided guidance assistance and warning concerning the desired, precise positioning of the automobile.

Many devices have been provided in the past for the proper and facilitated parking of an automobile in a garage. Many of these devices provided only assistance for longitudinal positioning, while others provided only for lateral spacing. A primary deficiency of many of the known devices was reliance for operation upon complicated and costly components; such as visual or audio electric signals, magnetic sensing units, solenoids, contact switches, and various combinations of arms, levers, gears and pulleys. Each device would require extensive and specialized installation processes, plus time and expense for routine maintenance and upkeep, and could be subject to serious operative damage if inadvertantly misused.

One particular device is a small, lightweight, luminescent-coated ball suspended from the garage ceiling and operable to contact the windshield of the automobile at eye-level and directly in front of the operator. While this is a simple device and is purported to provide both lateral and longitudinal guidance and warning to the operator, the device has serious deficiencies also. First, its utility for positive lateral guidance to the operator is questionable, because a common principle is not adhered to which requires that accurate guidance of a wheeled vehicle to a stationary target object depends upon sighting along a fixed reference point on the vehicle toward the target object, but rather the operator must sight to the target ball without use of a fixed reference point on the automobile. Second, the operator is required to fix his concentration and vision focal depth upon the ball target and thus much closer to his driving position than the forward extremities of the automobile during the latter stages of parking, thereby creating a situation which relies upon abnormal driving techniques and a potential hazard to safety of property. Third, the luminescent properties which may be applied to the ball surface to aid in use during darkness would be useful only to a minor degree because the beam of the automobile headlights would be ahead of and below the ball device during all but the initial stages of entering the garage and parking. Fourth, it is possible that the luminescent coating, dirt, grease, or other extraneous matter could transfer from the ball to the windshield directly in the primary line of the operator's vision in normal driving, creating an obvious hazard to clear visibility, particularly at night.

SUMMARY OF THE INVENTION

The object of the invention is to provide an improved target and signaling device which avoids the deficiencies inherent in earlier devices.

The invention is a device, simple in construction and use, which is highly efficient for both lateral and longitudinal positioning of an automobile in a garage.

The device is used by employing only normal driving techniques and mental/visual concentration common to automobile operation in any confined space. It provides for precise lateral spacing during the parking operation by displaying a highly visible, vertical target line toward which the automobile is guided with ease by using, for sighting purposes by the operator, any preselected dominant feature designed into the upper front section of the automobile hood; such as an emblem, a raised longitudinal ridge, or a decorative chrome strip; as is common to all domestic and foreign automobiles. The second function of the device, precise longitudinal spacing, is provided by employment of a simple principle associated with flexible fabric or other material suspended in a draped or loose-fold form, whereby touching of the material by an external force causes a clearly visible and instantaneous movement along the length of the drapes or folds, with the resultant signal that such touching has occurred. Thus, the light touching of the device with the front extremity of the automobile gives an instant signal to the operator that the precise longitudinal parking position has been reached and he stops the automobile with complete safety to it, the garage structure and objects nearby. Luminescent properties are provided to the ribbon material from which the device is constructed, and these properties are fully useful because the device remains within the headlight beam during darkness, and is otherwise visible in a dark garage during daylight. The device contacts only the front extremity (normally the bumper) of the automobile, thereby avoiding any possibility of hazardous blemishes, such as on the windshield. Further, if the flexible material used in construction of the device is condusive to defacing the automobile surfaces, it may be coated with a substance to prevent it. The device is installed by a simple process and may be similarly reinstalled upon change of automobiles. No maintenance or upkeep expense is required, and the device experiences an extended life period of usefulness as there is virtually no wear involved. Neither the automobile nor the device can be damaged by inadvertantly moving the automobile to other than the desired parking location.

BRIEF DESCRIPTION OF THE DRAWINGS

The attached drawings portray an embodiment of the invention and form a part thereof, and like parts in the various views are indicated by like numerals.

FIG. 1 is an elevation view of the device.

FIG. 2 is a cross-section view of the flexible material indicating the drapes or folds formed in the material when the device is suspended.

FIG. 3 is a side view of a conventional automobile properly parked in a garage with the device in contact with the front extremity of the automobile, and with the line of vision of the operator portrayed.

FIG. 4 is a front view of the automobile properly parked in the garage with the device in contact with the selected center front extremity of the automobile.

DESCRIPTION OF PREFERRED EMBODIMENT

The inventive device in FIG. 1 consists of a luminescent, light-reflective ribbon 1 of cloth fabric or of a comparably flexible, lightweight plastic fabric or metal; and hung freely by a suspension means 4 from the garage ceiling 6 with a fastener 5.

When cloth fabric is used for construction, the material is sewn with a seam at the upper extremity, into which is inserted a circular fastening device 2. At the lower extremity of the material, a flat, round weighting object 3 of lesser diameter then the width of the fabric is sewn into the seam. These construction features at each end of the ribbon material cause it to hang in the longitudinal, draped, loose folds which provide the signaling capability and to be taut and unmolested by light wind currents in the garage. Further, no metal such as weighting object 3 is exposed to the automobile surfaces. Tests have indicated that dimensions and weights of the component parts of the device may be varied, but are preferably the following: the ribbon material is 6 inches in width when laid flat, allowing the device to be approximately 3 inches wide when suspended. The ribbon is approximately 5 feet long to be easily visible to the operator of the automobile and to permit the weighting object 3 to be approximately 3 inches below the contact point 8 on the automobile. The fastener 2 is approximately 1½ inches in diameter, and the weighting object 3 is approximately 2 inches in diameter and 6 ounces in weight.

Although tests have indicated that the ribbon made of cloth fabric is preferable, the device may be constructed of other flexible materials such as light-weight metal or plastic fabric. If such alternate materials do not have inherant luminescent, light-reflective properties, they may be coated to provide them.

The device is installed by parking the automobile at the precise garage location desired. Fastener 5 is attached to garage ceiling 6 at the point where the ribbon 1 lightly touches the front extremity 8 of the automobile on line with the selected sighting feature 7. The height of the suspended device is set so the lower, weighted end 3 extends approximately 3 inches below the forward extremity 8 of the automobile.

Use of the device is simple in either single or multiple-automobile garages, and no new or unusual driving techniques are required. The operator guides the automobile to the garage opening and allows the front of the automobile to pass through the opening with normal lateral spacing. He then moves his attention to the inventive device, avoiding the otherwise requirement if the device were not in use to glance repeatedly to both sides to avoid colliding with a garage wall or objects stored nearby. By aiming the selected marker feature 7 on the automobile hood to the device, he establishes precise lateral spacing, while retaining his concentration and vision focus depth at and slightly beyond the front of the automobile. When the automobile touches the device and causes it to flutter, he stops the automobile with the desired parking position attained.

Accomplishment of the objects specified herein are provided by the inventive device. In that many possible embodiments may be made of the invention without departing from the scope thereof, it is understood that all matter set forth herein or shown in the accompanying drawings is to be interpreted as illustrative and not in a limiting sense.

Having thus described my invention, I claim:

1. In combination with an automobile garage and an automobile parked properly therein; an improved guidance target and visual stopping-signal device for alignment with a dominant design feature visible on the front of the automobile hood to the operator and for contact with the front extremity of the automobile, comprising an elongated strip of flexible material suspended by a yieldable means from the garage ceiling and constructed in gathers at the upper extremity of the flexible material and weighted at the lower extremity of the material, with resultant hanging in longitudinal, loosely folded drapes; the device being continuously visible to the operator within his line of sight and vision focus range as the desired parking position is approached and reached, serving as a vertical target-line for gaining optimum lateral spacing of the automobile and as a stopping-signal wherein the draped structure of the flexible material causes a readily discernible flutter signal to be transmitted along the device upon contact by the automobile.

* * * * *